May 16, 1950 G. C. SZIKLAI 2,508,048

FREQUENCY CONVERTER CIRCUITS

Filed Dec. 21, 1944

INVENTOR.
GEORGE C. SZIKLAI
BY [signature]
ATTORNEY

Patented May 16, 1950 2,508,048

UNITED STATES PATENT OFFICE 2,508,048

FREQUENCY CONVERTER CIRCUITS

George C. Sziklai, Princeton, N. J., assignor to Radio Corporation of America, a corporation of Delaware Application December 21, 1944, Serial No. 569,226

6 Claims. (Cl. 250—20)

My present invention relates to converter circuits such as are used, for example, in radio receivers of the superheterodyne type, and more particularly to converter circuits capable of operating at high frequencies and of being utilized in the reception of television or other wide-band signals.

It is one of the objects of the invention to provide simple frequency converter circuits for operation with three-element (triode) electron discharge tubes and which have good stability, contribute comparatively small shot-noise, and possess better signal-to-noise characteristics than converters employing multi-grid tubes.

A further object of the invention is to provide simple, economical circuits for frequency conversion in which radiation from the local oscillator through the antenna is substantially reduced.

A still further object of the invention is to provide an improved converter stage for operation particularly at high frequencies and over a wide frequency band, in which the signal oscillations are applied between cathode and ground, and in which the local oscillations, which may be produced by the converter itself or by a separate tube, are applied between the control grid of the converter and ground.

Figure 1:
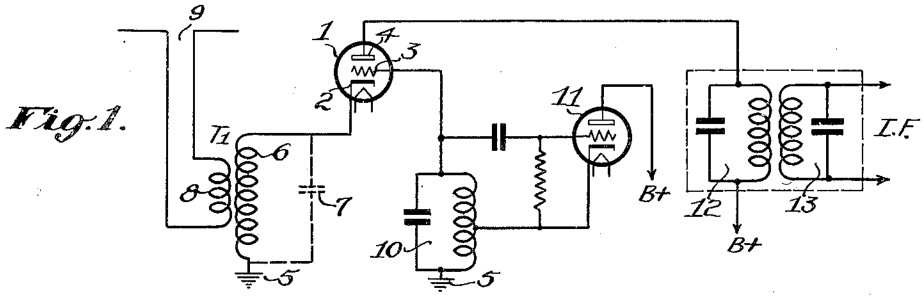
Figure 2:
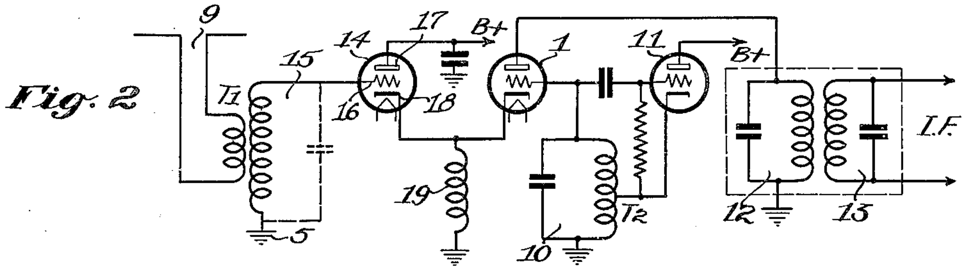
Figure 3:
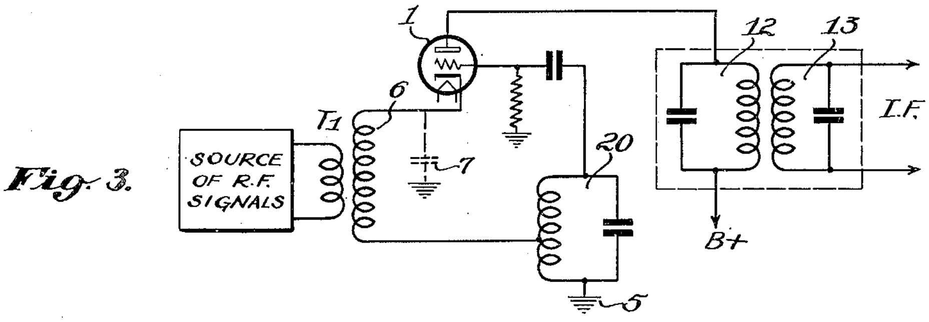
Figure 4:
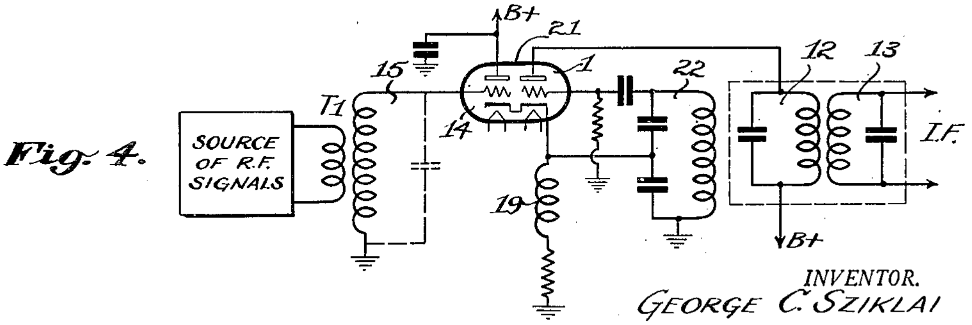

The novel features characteristic of my invention are set forth with particularity in the appended claims. The invention itself, however, both as to its organization and mode of operation together with further objects and advantages thereof, will best be understood by reference to the following description taken in connection with the accompanying drawings, wherein:

Figs. 1 and 2 illustrate certain embodiments of converter circuits according to the invention wherein a separate tube is employed as the local oscillator, and Figs. 3 and 4 are, respectively, modifications of the circuits disclosed in Figs. 1 and 2 wherein the local oscillations are produced by the converter itself.

Referring to the drawings, and first to Fig. 1, there is shown at 1 an electron discharge tube connected to serve as a frequency converter, or first-detector, in a receiver of the superheterodyne type, only so much of the receiver circuit being disclosed as is necessary for a proper understanding of the present invention. The discharge tube is of the triode type and comprises a cathode 2 (shown as of the indirectly heated type), a signal control grid 3 and an anode 4. Connected between cathode 2 and ground 5 is the secondary winding 6 of an input transformer $T_1$ which is tuned to the incoming signal frequency by a shunt condenser 7, shown dotted, since it may represent only the inherent capacitance of the input circuit including the grid-to-cathode capacity of the tube. The primary winding 8 of the input transformer is shown connected to a dipole antenna 9, although it will be understood that, if desired, a stage of radio frequency amplification may be interposed between the antenna and the converter stage.

Connected between the control grid 3 and ground 5 is a tuned circuit 10 which constitutes the frequency-determining circuit of the local oscillator tube 11. The oscillator circuit is shown, by way of example, as of the Hartley type, although it will be understood that any other suitable type may be used. The intermediate frequency resulting from the frequency conversion or interaction between the received signal oscillations and the locally-produced oscillations is derived from a tuned circuit 12 connected to the anode or output of converter tube 1. Coupled to this I. F. circuit is a second, similarly-tuned circuit 13 which constitutes the input to a succeeding I. F. stage (not shown), the signal passing successively through one or more I. F. stages, a second detector, audio amplifier, and translating device, as well known in the art.

The operation of the converter system of Fig. 1 may be explained as follows. The signal currents from antenna 9 are transferred through the input transformer $T_1$ to match the cathode impedance of tube 1. The grid 3 of this tube is, so far as practicable, grounded for all frequencies except for the frequency of the tuned circuit 10 of the local oscillator. The local oscillator varies the plate current or transconductance of tube 1 and therefore provides an intermediate frequency output across the tuned circuit 12. Since no other electrode than the plate consumes any part of the electron emission, the shot-noise is reduced to a minimum. At the same time the circuits of converter tube 1 act as a cathode follower for the oscillator signal, thereby attenuating such oscillations toward the antenna.

In Fig. 2 the circuit is substantially similar to that of Fig. 1 except for the fact that converter tube 1 is preceded by an amplifier 14 of the cathode-follower type. The signal oscillations from antenna 9 are transferred through transformer $T_1$ to the input circuit 15 which is connected between the grid 16 and ground 5 of tube 14, the anode 17 of which is grounded for radio frequencies. The cathode 18 of tube 14 is connected to ground through a load impedance 19 which is included also in the cathode circuit of converter tube 1. The latter acts as a cathode output stage for the oscillator signal, as in Fig. 1, and attenuates it toward the antenna since it works into an impedance like its own. Tube 14 further attenuates this signal by providing a divider through its grid-cathode capacity and the input impedance.

The converter circuits disclosed in Figs. 3 and 4 correspond, respectively, to the circuits of Figs. 1 and 2, the main difference being that in each of the former the converter tube is used also to generate the local oscillations. Fig. 3 shows a cathode input amplifier in which the grid-cathode portion acts as a Hartley oscillator, with the cathode return tapped at an intermediate point on the coil of circuit 20 tuned to the local oscillator frequency. The tuned circuit 20 serves substantially as a short-circuit for the signal frequency so that the tube acts as a grounded grid amplifier of the radio frequency signals with a changing mutual conductance at the oscillator frequency. The effect produces by beating action an intermediate frequency which is derived from the circuit 12 tuned to said I. F. and included in the output of tube 1.

In Fig. 4 there is shown the combination cathode-follower, grounded-grid amplifier of Fig. 2 with the two tubes 14 and 1 being replaced by a twin-triode 21 and with the second triode section 1 acting as a Colpitts oscillator as well as a converter. The circuit 22 tuned to the local oscillator frequency is connected between the grid of tube section 1 and ground and its cathode is connected between the two series capacitors of oscillator circuit 22. As in the previous converter circuits the tuned circuit 22 connected to the grid acts as a short-circuit for the signal frequency, the tube therefore acting as a grounded-grid amplifier with a changing mutual conductance at the oscillator frequency. The intermediate frequency is again derived from the circuit 12 included in the output or anode circuit of the converter.

The converter or mixer circuits shown in Figs. 1 to 4 and herein described may also be used advantageously in beat-frequency oscillators to produce low frequencies. It is well-known that in conventional mixer circuits if two oscillators are beat directly at small frequency differences, they may lock-in and therefore fail to produce the desired low beat frequencies. However, by utilizing any of the converter or mixer circuits of Figs. 1 to 4 and by injecting the outputs of two local oscillators on the cathode and grid, respectively, and connecting a low-pass filter to the plate of the mixer tube, a simple beat-frequency oscillator is obtained which overcomes the disadvantage of the lock-in feature. For example, in the case of Fig. 1 the output of one oscillator source would be coupled to the input coil 6 connected to the cathode 2 of the triode mixer 1 while the second oscillator source constituted by tube 11 and its associated circuits would inject its oscillations on the grid 3 of the mixer, as shown for the case of frequency conversion.

While I have shown and described certain preferred embodiments of my invention, it will be understood that various modifications and changes will occur to those skilled in the art without departing from the spirit and scope of this invention.

What I claim is:

1. A high frequency converter system comprising an electron discharge tube provided with a cathode, a control grid and an anode, a source of signal oscillations, a circuit tuned to the frequency of said signal oscillations connected between cathode and ground, said signal source being coupled to said tuned circuit only, means exclusive of the cathode for applying locally-produced oscillations to the control grid, and a circuit tuned to the resulting intermediate frequency connected to the anode.

2. A high frequency converter system comprising an electron discharge tube provided with a cathode, a control grid and an anode, a source of signal oscillations, a circuit tuned to the frequency of said signal oscillations connected between cathode and ground, said signal source being coupled to said tuned circuit only, a source of local oscillations, a circuit tuned to the frequency of said locally-produced oscillations connected between control grid and ground, and a circuit tuned to the resulting intermediate frequency connected to the anode of said tube.

3. A high frequency converter system comprising an electron discharge tube provided with a cathode, a control grid and an anode, a source of signal oscillations, a circuit tuned to the frequency of said signal oscillations connected between cathode and ground, a source of local oscillations, a circuit tuned to the frequency of said locally-produced oscillations connected between control grid and ground, said latter tuned circuit constituting a short-circuit from grid to ground of the signal frequency and varying the mutual conductance of the tube at the oscillator frequency, and a circuit tuned to the resulting intermediate frequency connected to the anode of said tube.

4. A high frequency converter system comprising an electron discharge tube provided with a cathode, a control grid and an anode, a source of signal oscillations, an input circuit tuned to the frequency of said signal oscillations coupled solely to the cathode of said tube, a source of local oscillations, a circuit tuned to the frequency of said local oscillations coupled to the control grid of said tube, and a circuit tuned to the resulting intermediate frequency connected to the anode of said tube.

5. A high frequency converter system comprising an electron discharge tube provided with a cathode, a control grid and an anode, a source of signal oscillations, an input circuit coupled to the cathode of said tube and including a load impedance element, a source of local oscillations, a circuit tuned to the frequency of said local oscillations coupled to the control grid of said tube, a circuit tuned to the resulting intermediate frequency connected to the anode of said tube, and a cathode-follower amplifier interposed between the source of signal oscillations and the cathode input circuit for attenuating the local oscillations in a direction toward the signal source to thereby reduce reradiation of said oscillations.

6. A high frequency converter system comprising an electron discharge tube provided with a cathode, a control grid and an anode, an impedance element connected between cathode and ground, a source of signal oscillations, means coupling said source to said impedance element for impressing said signal oscillations on the cathode exclusively, means for applying locally-produced oscillations to the control grid, and a resonant output circuit tuned to the resulting intermediate frequency and connected to the anode.

GEORGE C. SZIKLAI.

REFERENCES CITED

The following references are of record in the file of this patent:

UNITED STATES PATENTS

| Number | Name | Date |
|---|---|---|
| 1,573,282 | Stone | Feb. 16, 1925 |
| 1,996,847 | Zimmerman | Apr. 9, 1935 |
| 2,273,640 | Haantjes et al. | Feb. 17, 1942 |
| 2,285,372 | Strutt et al. | June 2, 1942 |
| 2,296,107 | Kimball | Sept. 15, 1942 |
| 2,315,658 | Roberts | Apr. 6, 1943 |
| 2,370,758 | Thompson | Mar. 6, 1945 |